US012578274B2

(12) United States Patent
Zhang et al.

(10) Patent No.: US 12,578,274 B2
(45) Date of Patent: Mar. 17, 2026

(54) LABEL-FREE, ON-CHIP DETECTION OF OPIOIDS THROUGH SURFACE-ENHANCED RAMAN SPECTROSCOPY

(71) Applicant: Trustees of Dartmouth College, Hanover, NH (US)

(72) Inventors: Michael Zhang, Hanover, NH (US); Congran Jin, White River Junction, VT (US); Yuan Nie, Hanover, NH (US); Yundong Ren, Lebanon, NH (US); Nanjing Hao, Hanover, NH (US); John X. J. Zhang, Hanover, NH (US)

(73) Assignee: Trustees of Dartmouth College, Hanover, NH (US)

( * ) Notice: Subject to any disclaimer, the term of this patent is extended or adjusted under 35 U.S.C. 154(b) by 1061 days.

(21) Appl. No.: 17/677,389

(22) Filed: Feb. 22, 2022

(65) Prior Publication Data

US 2022/0268683 A1    Aug. 25, 2022

Related U.S. Application Data

(60) Provisional application No. 63/152,313, filed on Feb. 22, 2021.

(51) Int. Cl.
| | |
|---|---|
| *G01N 21/65* | (2006.01) |
| *G01N 15/06* | (2006.01) |
| *G01N 15/01* | (2024.01) |
| *G01N 15/075* | (2024.01) |

(52) U.S. Cl.
CPC ....... *G01N 21/658* (2013.01); *G01N 15/0606* (2013.01); *G01N 15/01* (2024.01); *G01N 15/075* (2024.01)

(58) Field of Classification Search
CPC . G01N 15/0606; G01N 21/658; G01N 15/075
See application file for complete search history.

(56) References Cited

U.S. PATENT DOCUMENTS

| | | | | |
|---|---|---|---|---|
| 2019/0246635 A1* | 8/2019 | Zhang | ..................... | A01N 59/20 |
| 2022/0299444 A1* | 9/2022 | Garg | .................... | G01N 21/658 |
| 2025/0130174 A1* | 4/2025 | Zhou | ....................... | G01N 21/94 |

FOREIGN PATENT DOCUMENTS

CN          102759520          *    5/2012    ....... G01N 33/54313

OTHER PUBLICATIONS

Kandjani et al. Zinc oxide/ silver nanoarrays as reusable SERS substrates with controllable 'hot spots' for highly reproducible molecular sensing. Journal of Colloid and Interface Science 436: 251-257 (2014).*

(Continued)

*Primary Examiner* — Gailene Gabel
(74) *Attorney, Agent, or Firm* — Hodgson Russ LLP

(57) ABSTRACT

Opioids can be detected using a test system with ZnO pillars arranged in an array on a silicon wafer. Silver particles are on a top surface and/or side surface of the ZnO pillars. A sample fluid is applied to the test system. A concentration of an opioid compound in the sample fluid is determined using Surface-Enhanced Raman Spectroscopy of the test system. The sample fluid can be blood or a fluid isolated from blood.

8 Claims, 15 Drawing Sheets

(56) References Cited

OTHER PUBLICATIONS

Chen et al., Surface-Enhanced Raman Detection of Melamine on Silver-Nanoparticle-Decorated Silver/Carbon Nanospheres: Effect of Metal Ions, ACS Applied Materials and Interfaces, 2011, 3091-3096, vol. 3.

Farquharson et al., A Surface-Enhanced Raman Spectral Library of Important Drugs Associated With Point-of-Care and Field Applications, Frontiers in Chemistry, Oct. 25, 2019, vol. 7, Art. 706.

Masterson et al., Enhancing Nonfouling and Sensitivity of Surface-Enhanced Raman Scattering Substrates for Potent Drug Analysis in Blood Plasma via Fabrication of a Flexible Plasmonic Patch, Analytical Chemistry, Jan. 12, 2021, 2578-2588, vol. 93, Issue 4, American Chemical Society.

Shende et al., Detection of Codeine and Fentanyl in Saliva, Blood Plasma and Whole Blood in 5-minutes Using a SERS Flow-Separation Strip, Analyst, 2019, 5449-5454, vol. 144, The Royal Society of Chemistry.

* cited by examiner

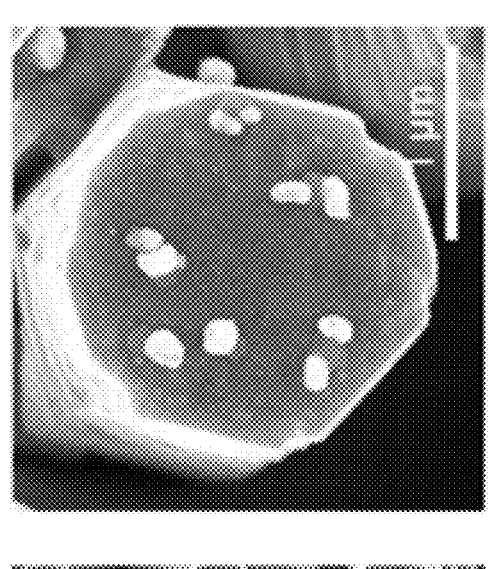
FIG. 2B
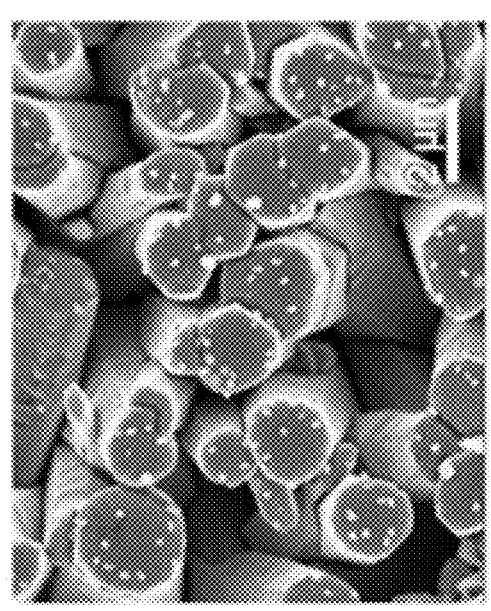
FIG. 2A
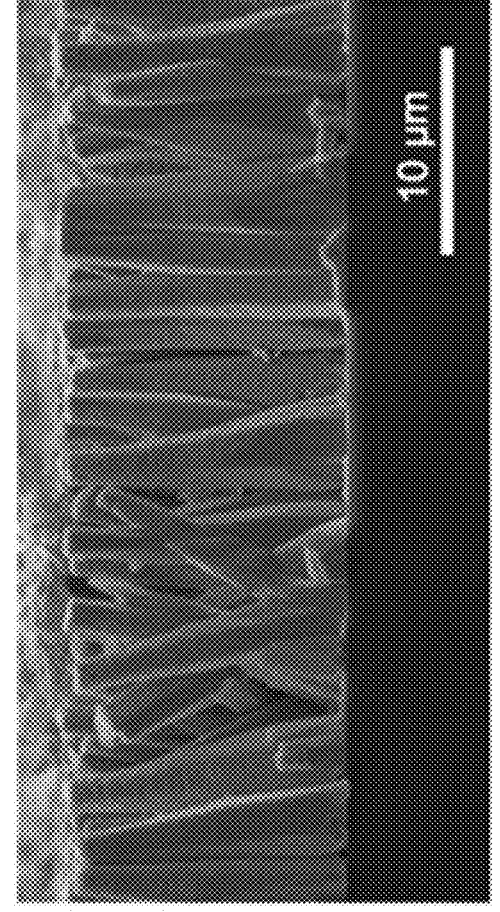
FIG. 2D
FIG. 2C

LABEL-FREE, ON-CHIP DETECTION OF OPIOIDS THROUGH SURFACE-ENHANCED RAMAN SPECTROSCOPY

CROSS-REFERENCE TO RELATED APPLICATIONS

This application claims priority to the provisional patent application filed Feb. 22, 2021 and assigned U.S. App. No. 63/152,313, the disclosure of which is hereby incorporated by reference.

FIELD OF THE DISCLOSURE

This disclosure relates to medical diagnostics and, more particularly, opiate detection.

BACKGROUND OF THE DISCLOSURE

Opioid abuse is a significant public health problem. Over two million Americans have some form of addiction to opioids. However, despite governmental programs established to treat overdoses and restrict opioid distribution, there are still few screening tools that are quantitative, portable, and easy to use for high-throughput mapping and monitoring this ongoing crisis.

The opioid crisis has posed major challenges for communities across America and the world for decades. For example, oxycodone, one of the most abused opioids, caused an average of 5526 deaths every year from year 2011 to 2016. Despite current attempts to cure the adverse impacts of opioid abuse and overdoses as they appear, there are still few tools available to map and understand this ongoing epidemic. For opioid substance detection, there are two existing techniques that are commercially available, namely immunoassays and gas chromatography-mass spectrometry (GC-MS). The working mechanism of the immunoassay method is to utilize the change in enzyme activity when a specific antibody binds the drug. Enzyme activity is measured using a spectrophotometry. However, most immunoassays have a poor reaction to opiate substance like oxycodone and oxymorphone and may lead to false-negative results. GC-MS works by separating the sample mixture through heating and flow of gas. Then the MS identifies the individual substance by measuring and comparing the mass of the molecule. This method can provide more accurate results, but the technique is costly and can require a time-consuming and laborious sample preparation procedure that can take up to 24 hours.

In recent years, Surface-Enhanced Raman Spectroscopy (SERS) has become a popular method of detecting trace amounts of chemical compounds, especially drugs, due to its ability to enhance the Raman scattering signals of detection targets with its comparatively high sensitivity, rapid detection time, and non-destructive analysis method. However, many SERS applications have not been tested using real blood samples or can only detect opioids with a concentration as low as several hundred nanograms per milliliter or more. Another problem in many SERS applications is the selection of a highly efficient plasmonic enhancement substance and the optimization of the detection substrate design. In particular, noble metals are usually the material of choice for SERS platforms due to their desirable plasmonic properties, which allows them to enhance Raman signals when stimulated electromagnetically via localized surface plasmon resonance (LSPR). Specifically, interactions between the electron clouds of nanoscale conductive particles and relatively larger electromagnetic waves results in the regular oscillations of the particle's electrons, creating an evanescent conduction band in which the electromagnetic wave is trapped. This conduction band creates an amplification effect for many spectroscopic methods that measure a substrate's scattering properties, making it useful in SERS applications. Another limitation of many of the current SERS-based opioid detecting devices is that they have not been tested using real blood samples, which is an important step for verifying the device's performance in practical settings for detecting the drug use in people. While others have tested the drugs in blood, their experimental detection limit is 0.5 µg/mL, which is too large for detecting trace amount.

Immunoassay methods react poorly to oxycodone and often produce false negative results. Thus, immunoassays are typically unsuitable for detecting oxycodone. This can be especially true for situations that require fast testing. The GC-MS method can produce a much more reliable result, but is expensive, labor-intensive, and time-consuming (e.g., more than 24 hours). GC-MS also can require chemical pretreatment, which adds to the processing time. Improved methods and devices are needed.

BRIEF SUMMARY OF THE DISCLOSURE

A chip with silver particle-decorated zinc oxide (ZnO) arrays on silicon wafers can be used for label-free detection of opioids through SERS. The enhanced signal is provided by the increased local plasmonic effect of the nanostructure. A small amount of test sample (e.g., 5 µL) of a fluid is dropped onto a chip, which is then placed on a stage of a Raman spectrometer. The sample is scanned using Raman spectroscopy. The collected data can reveal if possible opioids in the sample. The analyzing process may take ten minutes or less.

A test system is provided in a first embodiment. The test system includes a silicon wafer, a plurality of ZnO pillars arranged in an array on the silicon wafer, and a plurality of silver particles disposed on the ZnO pillars. Each ZnO pillar has a top surface and a side surface between the top surface and the silicon wafer. The silver particles can be disposed on the top surface and the side surface of one or more of the ZnO pillars.

The ZnO pillars can have a cross-sectional dimension of 200 nm to 3 µm. In an instance, the cross-sectional diameter is from 1.7 µm to 2.3 µm.

The silver particles can have an average diameter of 50 to 200 nm. In an instance, the average diameter is from 106 nm to 188 nm.

An average distance between silver particles can be around 100 nm or less.

A density of ZnO pillars can be from 10 to 12 pillars in every 100 µm² area.

A method is provided in a second embodiment. The method includes providing a test system. The test system includes a silicon wafer, a plurality of ZnO pillars arranged in an array on the silicon wafer, and a plurality of silver particles disposed on the ZnO pillars. Each ZnO pillar has a top surface and a side surface between the top surface and the silicon wafer. A sample fluid is applied to the test system. A concentration of an opioid compound in the sample fluid is determined using Surface-Enhanced Raman Spectroscopy of the test system.

The sample fluid can be blood or isolated from blood. In an instance, the sample fluid is a fluid extracted or centrifuged from blood. In another instance, the fluid is blood serum without white blood cells or red blood cells.

The concentration of the opioid compound can be from 9 ng/mL to 900 µg/mL.

The silver particles can be disposed on the top surface and the side surface of one or more of the ZnO pillars.

The ZnO pillars can have a cross-sectional dimension of 200 nm to 3 µm.

The silver particles can have an average diameter of 50 to 200 nm.

An average distance between silver particles can be around 100 nm or less.

A density of ZnO pillars can be from 10 to 12 pillars in every 100 µm² area.

A method is provided in a third embodiment. The method includes decomposing zinc acetate into ZnO nanocrystals on a silicon substrate. ZnO pillars are grown on the ZnO nanocrystals in zinc nitrate hexahydrate and HMTA solution. Silver particles are applied to the ZnO pillars using UV radiation, such as to both a top surface and side surface.

DESCRIPTION OF THE DRAWINGS

For a fuller understanding of the nature and objects of the disclosure, reference should be made to the following detailed description taken in conjunction with the accompanying drawings, in which:

FIG. 2A illustrates a scanning electron microscope top view image of an embodiment of the ZnO array with silver particles;

FIG. 2B illustrates a magnified image of the top of a single ZnO pillar in an embodiment of the ZnO array with silver particles;

FIG. 2C illustrates a magnified image of a single ZnO pillar in an embodiment of the ZnO array with silver particles attached to a side surface of the ZnO pillar;

FIG. 2D is a cross-sectional view of an embodiment showing the vertically-aligned ZnO microarray with silver particles;

DETAILED DESCRIPTION OF THE DISCLOSURE

Figure 1:
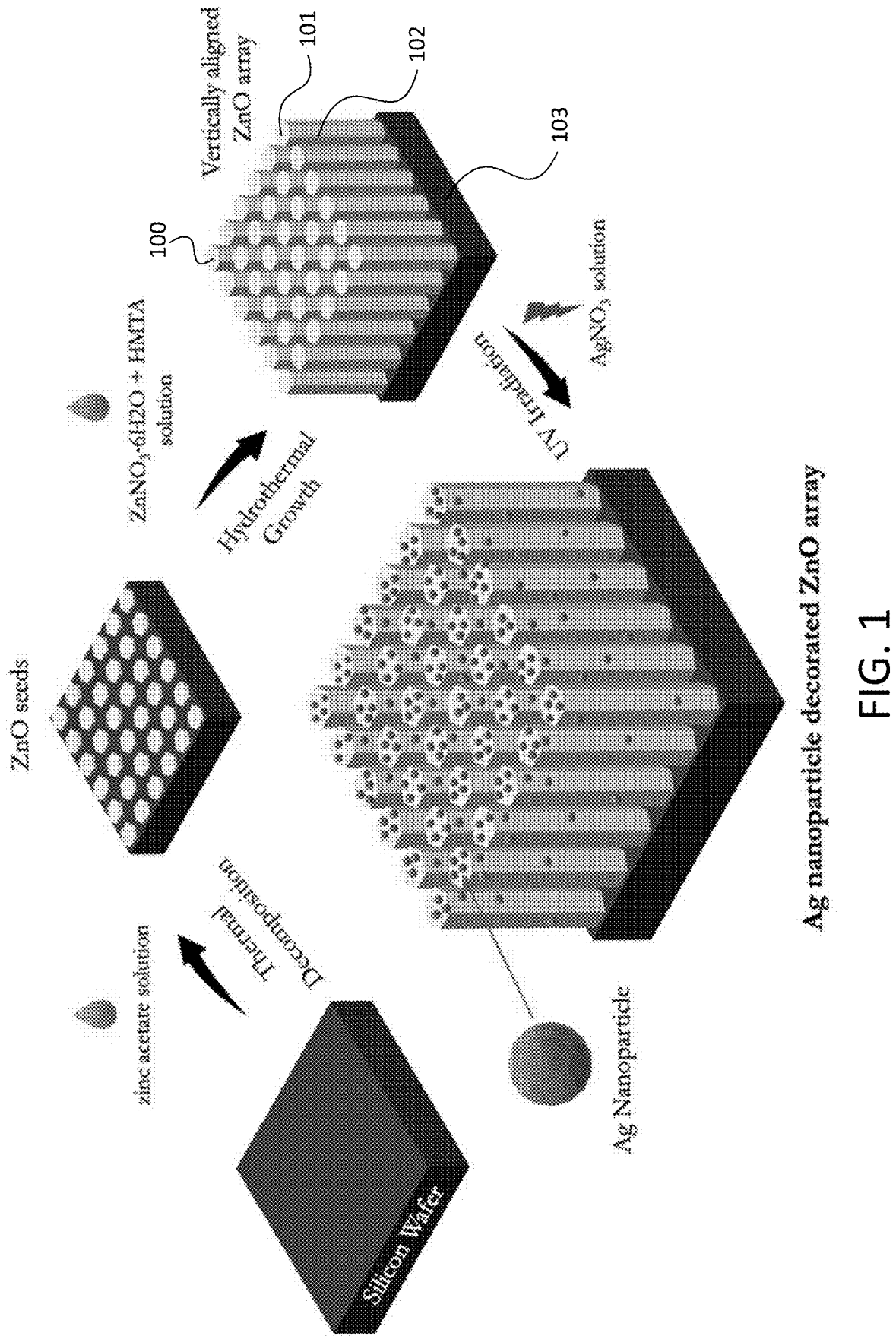
FIG. 1 is a schematic of an embodiment of a ZnO chip with silver particles and its fabrication process.

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Embodiments disclosed herein can provide rapid detection of the existence and concentration of opioid substances (e.g., oxycodone, hydrocodone, codeine, morphine, fentanyl, methadone, oxymorphone, tapentadol, and the like) in a fluid environment. For example, body fluids can be tested. A plasmonic zinc oxide (ZnO) arrays-on-silicon sensor for the label-free detection of opioids through surface-enhanced Raman spectroscopy (SERS) was demonstrated. Embodiments of the sensor disclosed herein can reliably detect opioid concentrations at 90 ng/mL or even lower (e.g., 18 ng/mL or 9 ng/mL) with accuracy and sensitivity. The chips can provide a cost-effective, high-throughput method for detecting the opiate oxycodone, thereby providing a powerful tool to monitor and control the emerging public health threats.

Opioid sensing performance of the embodiments disclosed herein was evaluated by testing the device with oxycodone, a potent and commonly-abused opioid, dissolved in methanol and blood serum. Ag particles were in-situ patterned onto the ZnO array to form the completed sensing platform. The resulting ZnO—Ag arrays were characterized using a Scanning Electron Microscope (SEM), Energy Dispersive X-Ray Analysis (EDS), and element mapping. In addition, the enhanced electric field induced by the localized surface plasmonic resonance at the silver particle decorated ZnO is simulated using COMSOL. Opioid-containing samples at varying concentrations, from 90 ng/mL to 900 μg/mL, were tested using SERS to characterize the disclosed chip's accuracy and sensitivity.

In recent years, SERS has become a popular method of detecting trace amounts of chemical compounds due to its ability to enhance the Raman scattering signal of detection targets. In particular, SERS has comparatively high sensitivity, rapid detection time, and non-destructive analysis method that is combined with the increased accessibility of portable Raman spectroscopies. This makes SERS useful for various applications in material sciences, biochemistry, and environmental science. However, the selection of a highly-efficient plasmonic enhancement substance and the optimization of the detection substrate design can be challenging. Noble metals may be chosen for SERS platforms due to their desirable plasmonic properties, which allows them to enhance Raman signals when stimulated electromagnetically via LSPR.

Gold can be used as a suitable LSPR materials for SERS. While gold is relatively biocompatible, gold has high production costs. Silver has higher electrical and thermal conductivity than gold, making it a more efficient and cost-effective plasmonic material for use in spectroscopic enhancement. Therefore, silver may be used as a surface-coated noble metal for SERS sensor platforms.

The SERS sensor platform designs can include the use of colloids nanospheres, nanorods, or more complex 3D structures such as arrays, nanotrees, nanoflowers, or even butterfly-inspired structures. In particular, the category of novel 3D designs has become a topic of interest due to their ability to increase the platform surface area significantly, therefore allowing for a higher density of coated plasmonic materials. This allows for "hotspots" of plasmonic enhancement, enabling highly reproducible, sensitive, and specific molecular sensing.

Zinc oxide can be used as a platform synthesis material due to its biosafety, versatility, and low-cost manufacturing. ZnO has optoelectronic and electrochemical properties that can enable various sensing and biomedical engineering applications. ZnO arrays can provide a platform for SERS-based sensing of various substances because ZnO offers a higher reproducibility and stability, larger surface-to-volume ratio, and a 3D platform.

A chip can be fabricated. First, a ZnO nanoarray can be grown on a silicon chip (e.g., approximately 1 cm by 1 cm) using a hydrothermal technique. Silver particles can be decorated on the ZnO nanoarray using ultraviolet (UV) irradiation. The size of the ZnO nanoarray and the silver particles can be controlled during the process. Simulations using a finite element method (FEM) can be carried out to confirm the plasmonic effect of the fabricated structure.

A two-step hydrothermal growth and UV irradiation protocol can be used to synthesize ZnO arrays decorated with silver particles on a silicon chip. These particles contribute to the local surface plasmonic effect and an increase in silver SERS enhancement "hotspots."

Embodiments of the chip disclosed herein can measure a low oxycodone concentration of at least 9 ng/mL (e.g., at least 18 ng/mL or at least 90 ng/mL). The silver decorate the ZnO array on the chip that serves as a portable, sensitive, and highly-specific SERS sensor for the detection of dissolved opioid substances at low concentrations. The embodiments disclosed herein have the potential to be used in many healthcare applications in the drug abuse crisis.

Sample fluid containing oxycodone with concentrations of 0 ng/ml, 100 ng/ml, 1 μg/ml, 10 μg/ml, and 500 μg/ml were tested using an embodiment of the disclosed chip. All concentrations were successfully detected by identifying the characterized peaks of oxycodone in the Raman spectrum. The intensity of the Raman signal from each sample was linearly related to the concentration of the tested sample. Thus, by examining the relative intensity of characteristic peaks, the concentration of oxycodone can be determined.

Embodiments disclosed herein can detect an opiate substance using a point-of-care chip design with silver particles decorated on a ZnO nanoarray. The nanostructure of this nanoarray can enhance the local plasmonic resonance, which is captured by Raman spectroscopy to produce data. The enhanced signal can generate data that may be easily analyzed with high selectivity and sensitivity. The time from applying the sample fluid to reading out a result can take less than 10 minutes.

Referring to the design of FIG. 1, the test system can include a silicon wafer with ZnO pillars arranged in an array. Each of the ZnO pillars 100 has a top surface 101 and a side surface 102 between the top surface and the silicon wafer 103. The impurity level in the ZnO pillars may be low enough to not affect any results.

The substrate size can vary. In an example, the silicon wafer is 1 cm by 1 cm square, but other shapes and sizes are possible. The substrate may be sized such that it can be easily handled by laboratory staff.

The ZnO pillars (e.g., ZnO rods) may have a homogenous dispersity. The ZnO pillars can have dimensions in the nm to μm range. The average width of the cross section of the ZnO pillars may be from 200 nm to 3 μm, including all 0.1 nm values and ranges therebetween (e.g., 2±0.3 μm). If the cross section of the ZnO pillars is larger than 3 μm, then there may be more silver particles on the top surface of the ZnO pillars than on the side surfaces, which would weaken the strength of a sensing signal. If the cross section of the ZnO pillars is smaller than 200 nm, then the ZnO pillar may not be capable of supporting enough silver particles, which also would weaken the strength of a sensing signal.

The height of the ZnO pillars may be from 1 to 15 μm, including all nm values and ranges therebetween (e.g., approximately 14 μm). Without intending to be bound by any particular theory, the height of the ZnO pillars may be on the micron scale because such a size is suitable for local signal enhancement, but large enough to support a desirable/sufficient number of particles. In various examples, the ZnO pillars have a height to width ratio greater than 1. For example the height to width ratio may be >1:1 to 5:1, including all 0.1 ratio values and ranges therebetween. A larger height to width ratio would mean the ZnO pillar is too narrow to support enough silver particles, which would weaken the strength of a sensing signal. A smaller height to width ratio would result in more silver particles on the top surface of the ZnO pillars than on the side surfaces, which would weaken the strength of a sensing signal.

The cross-section of the ZnO pillars can be different shapes. For example, the ZnO pillars have a hexagonal cross section, but other circular, ovoid, or polygonal shapes are possible.

Without intending to be bound by any particular theory, it is considered that the ZnO pillars operate as scaffold. Silver particles may be disposed (e.g., deposited) such that the silver particles cover (e.g., coat) at least a portion of a surface of the pillar or the whole pillar surface. The ZnO pillars can be vertically arranged.

The pillars may be arrayed on a substrate (e.g., the chip) as a result from the hydrothermal ZnO growth process. The density of the array may be controlled by controlling the seeding density (the concentration of the seeding solution and the spincoating speed of the seeding process) in the process. In various examples, there are about 10-12 pillars (e.g., 10, 11, or 12) in every 100 $\mu m^2$ area, though higher or lower densities are possible depending on the size of the pillar. Without intending to be bound by any particular theory, it is considered that the higher the density the more enhancement on the signal, and, thus, the better sensitivity and lower detection of limit of the chip.

While ZnO pillars are used, other materials also can be used in the pillars or as a scaffold for the particles.

Silver particles are disposed on the ZnO pillars. The ZnO pillars can serve as a scaffold for the silver particles. Usually the silver particles are disposed on the top surface 101 of the ZnO pillars 100, but the silver particles also can be disposed on the side surface 102 of the ZnO pillars. The side surface 102 can be between the top surface 101 and the substrate (e.g., silicon wafer 103). Attaching silver particles on the side surface 102 and the top surface 101 can increase sensitivity.

The particles may have various shapes. The particles may be the same shape or may be different shapes. For example, the particles may be spherical, ellipsoidal, or spike-shaped. Spherical particles may be easier to fabricate and can provide sufficient results. While other shapes (e.g., ellipsoid, spike-shape) may give stronger signal due to their aspect ratio and spike features, these particles are usually more difficult to fabricate.

The particles may disposed in similar densities or different densities on the top side and side of the pillars. Without intending to be bound by any particular theory, it is considered that the higher the density of particles, the better the local enhancement of the signal until the particles are too close to touch each other. For example, "hot spots" may occur when the particles within 100 nm. However, local enhancement may occur on single (or separate) particles. Hot spots or local enhancement effect will increase the signal intensity and, thus, improve the sensitivity of the chip as well as lower the limit of detection of the chip.

The particles may have various sizes. The particles may be roughly the same size (e.g., a homogenous size dispersity) or different sizes. The particles may have an average diameter of 50 to 200 nm, including all 0.1 nm values and ranges therebetween (e.g., 147±41 nm). Without intending to be bound by any particular theory, it is considered the smaller the particles, the more pronounced the local enhancement. However, when the particles get too small, they cover a smaller area and decrease the enhancement effect.

While silver particles are disclosed, gold particles, platinum particles, or other particles that include precious metals can be used. A mixture of particles that each include a precious metal can be used in an embodiment. For example, the mixture can include silver and gold, silver and platinum, or gold and platinum. The mixture also can include silver, gold, and platinum. These mixtures optionally can include other precious metals or other metals.

The following example is merely one possible implementation. It is not meant to be limiting.

Zinc acetate ((CH$_3$CO$_2$)$_2$Zn), 99.99%), zinc nitrate hexahydrate (Zn(NO$_3$)$_2$·6H$_2$O, 98.0%), hexamethylenetetramine (C$_6$H$_{12}$N$_4$, HMTA, >99.0%), silver nitrate powder (AgNO$_3$, ≥99.0%), and 1 mg/mL oxycodone solution (item id O-002-1ML) from Sigma Aldrich were used in this example. Deionized (DI) water was from a Milli-Q water ultrapure water purification system. The silicon wafer (<1 0 0>, single-side-polished) was from Wafer University.

To fabricate the silver particle-decorated ZnO array chip, a piece of silicon wafer was cut into an approximately 2 cm by 2 cm square and washed by deionized (DI) water and treated by oxygen plasma. Next, a thermal treatment decomposed zinc acetate into ZnO nanocrystals as seeds on the silicon substrate for synthesis of vertically aligned ZnO array. The vertically aligned ZnO array growth method included covering the substrate is covered by a layer of 5 mM zinc acetate solution (in DI water) and then transferring the substrate into an oven at 180° C. for 40 min for thermal decomposition of the zinc acetate to create ZnO seeds on the substrate. Zinc nitrate hexahydrate (75 mM) and HMTA (50 mM) was added to 45 mL of DI water followed by sonication for 5 minutes to provide the hydrothermal growth solution. The seeded substrate was then placed in the growth solution with the seeded side facing downward in a beaker that was covered by aluminum foil and placed in an oven for three hours at a temperature of 88° C. This growth cycle with newly-made growth solution was repeated six times to grow vertical ZnO wire of approximately 12 μm in height. Next, the chip was rinsed with DI water to remove ZnO residuals and dried in an oven at 50° C. A UV irradiation method was employed to generate the silver particles on top of the ZnO array. The as-fabricated chip was immersed in a 5 mM AgNO$_3$ solution (in DI water) and irradiated under a UV lamp (approximately 30 W/m$^2$ intensity) for one hour. The finished chip was then washed with DI water to remove excess product and dried at room temperature.

Scanning electron microscopy (SEM) was performed on a FEI Helios 5CX dual beam scanning electron microscope operating at 5 kV. The energy-dispersive X-ray spectroscopic (EDS) measurements and the chemical mapping were performed with the SDD X-ray detector (Ametek®) attached to the TESCAN Vega3 scanning electron microscope operating at 30 kV.

1 mg/mL oxycodone solution was diluted into 500 μg/mL, 10 μg/mL, 1 μg/mL, and 100 ng/mL solutions. Each concentration had three replicates. Approximately 5 μL of each sample was pipetted onto the prepared silver particles decorated ZnO (Ag@ZnO) array substrates. A He—Ne laser beam (power=10 mW, wavelength=532 nm) was focused onto the substrate through a Raman spectrometer (Horiba labRAM Raman/AIST-NT AFM). The Raman signals of oxycodone were collected by an air-cooled open electrode 1024×256 pixel CCD detector. A standard silicon wafer was applied for calibration before all the measurements and its spectra was used for background correction. For the blood sample oxycodone detection test, de-identified patient serum samples were used. The patient serum samples were obtained from Dartmouth-Hitchcock Medical Center (Lebanon, New Hampshire, USA). All samples were handled according to Dartmouth's Environmental Health and Safety and BSL-2 protocols. Blood serum samples were kept in a freezer before the test. The oxycodone solution was added to the raw blood serum that was diluted 100 times with phosphate buffered saline (PBS, Sigma Aldrich) in the serum samples to obtain 900 μg/mL, 90 μg/mL, 9 μg/mL, 900 ng/mL and 90 ng/mL. For each concentration, measurements at five different locations selected randomly on the chip were carried out with point scan of the Raman spectroscopy. The Raman measurement and parameters are identical to the previous test.

The fabricated zinc oxide arrays on silicon wafers demonstrated label-free and sensitive detection of opioids. ZnO has become popular in biosensor applications due to its electrochemical and optoelectronic properties, low-cost manufacturing, versatility, and relative eco-friendliness. Silver particles decorated the ZnO arrays on silicon wafers, which were used as portable, label-free, and efficient SERS-based sensors. These chips were fabricated via a three-step fabrication process including a ZnO seeding, hydrothermal growth of the vertically aligned ZnO array, and a UV irradiation of the silver particles. The summarized fabrication process and the schematic of the silver particles decorated ZnO array chip are depicted in FIG. 1. The ZnO array provides a three dimensional (3D) substrate for the silver particles, which is effective for SERS-based sensing. The high electromagnetic enhancement factor induced by the 3D ZnO array structure can result from the high surface area to volume ratio that allows for a much higher load of metal particles. Other advantages of ZnO arrays include their inability to absorb visible light, high controllability over size and dimensions, stability in regular environment, and suitability for mass production. In addition, the enhancement effect also can contribute to plasmonic resonance due to the coupling of the incident light to the surface plasmons enabled by the pathways formed in the small gaps between the ZnO pillars.

Figure 2E:
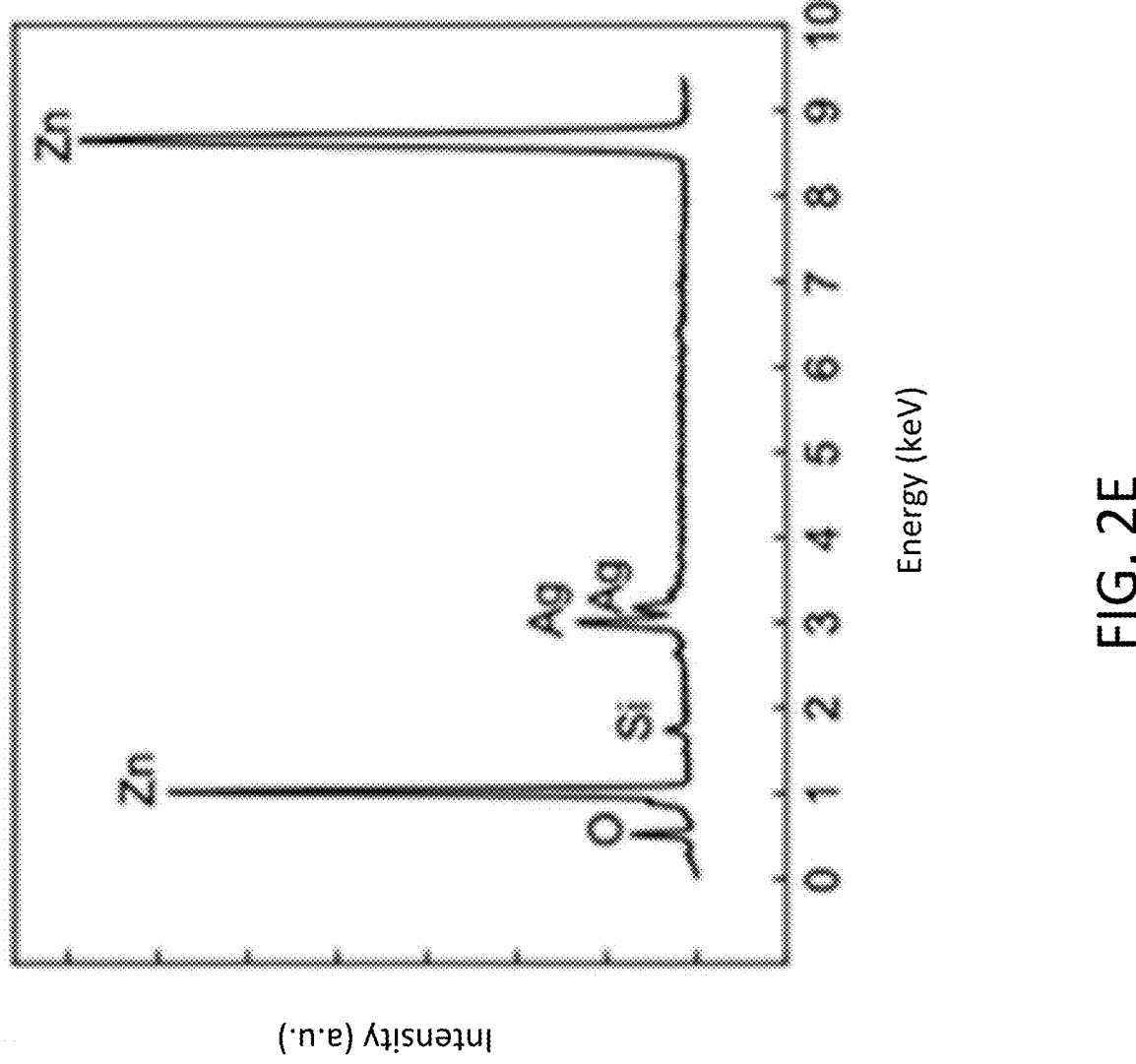
FIG. 2E is an x-ray energy spectrum of an embodiment of the ZnO array with silver particles showing elements Zn, O, Ag, and Si.
Figures 2F, 2G, 2H:
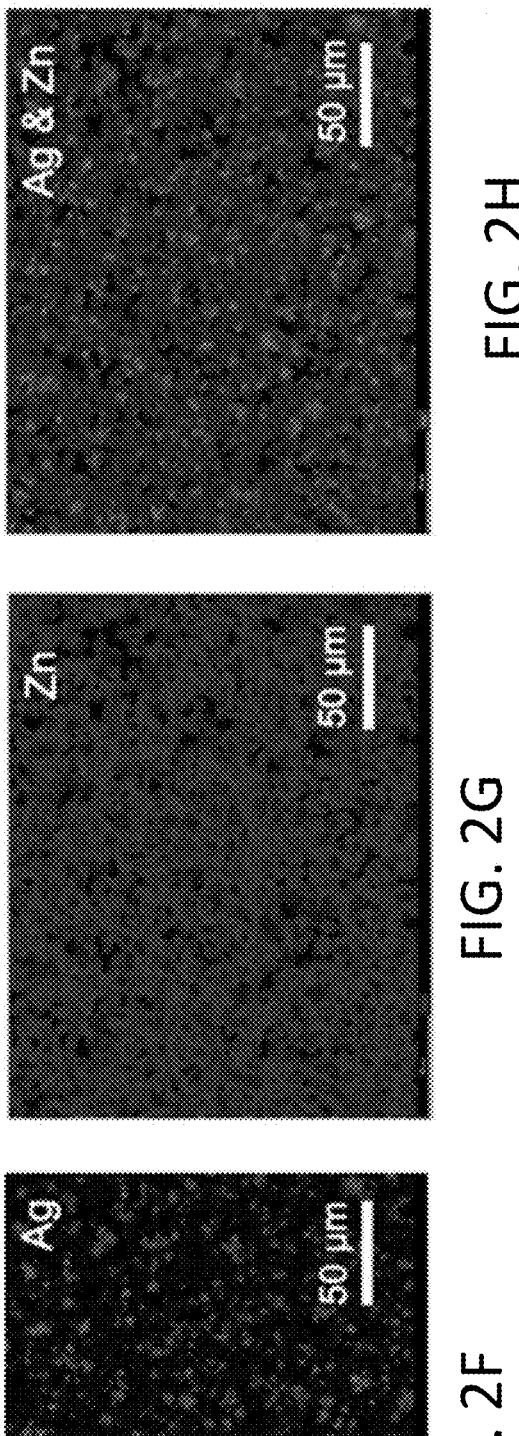
FIG. 2F shows EDS chemical mapping of Ag for an embodiment of the ZnO chip with silver particles.
FIG. 2G shows EDS chemical mapping of Zn for an embodiment of the ZnO chip with silver particles.
FIG. 2H shows combined mapping of Ag and Zn in an embodiment of the ZnO chip with silver particles demonstrating a relatively uniform dispersion of Ag particles on the ZnO microarray.

The as-fabricated chip was then characterized by EDS (FIG. 2). FIG. 2A shows the top view of the chip where silver particles are distributed on the top surface of the ZnO pillars. FIG. 2B is a zoom-in image that shows the hexagonal cross section of a ZnO pillar with silver particles on the top surface. The silver particles also can be seen on the side surface of ZnO pillars as shown in FIG. 2C. From the SEM images, it is confirmed that silver particles are placed on both the top surface and the side surface of the ZnO array. The average width of the cross section of the ZnO pillar is approximately 2±0.3 μm, and the size range of the silver particles is approximately 50-200 nm in diameter. FIG. 2D shows the cross-section view of the chip, and the height is approximately 14 μm. The EDS spectrum confirming the existence of the element Silver, zinc, oxygen, and silicon at their corresponding characteristic energy is shown in FIG. 2E. The silver element has its characteristic energies at 2.98 and 3.15 keV; zinc element has the characteristic energy at 1.01 and 8.64 keV; oxygen element has its characteristic energy at 0.52 keV; and silicon element has its characteristic energy is at 1.74 keV. FIG. 2F and FIG. 2G are the chemical mapping of the element silver and zinc, respectively. The vertical ZnO pillar and the silver particles are uniformly distributed on the chip. In addition, FIG. 2H is the combined chemical mapping of both element silver and zinc, indicating that the silver particles are uniformly distributed on the ZnO array. The silver particle content in terms of atomic ratio and weight ratio are 3.12% and 6.96%, respectively.

Figure 3A:
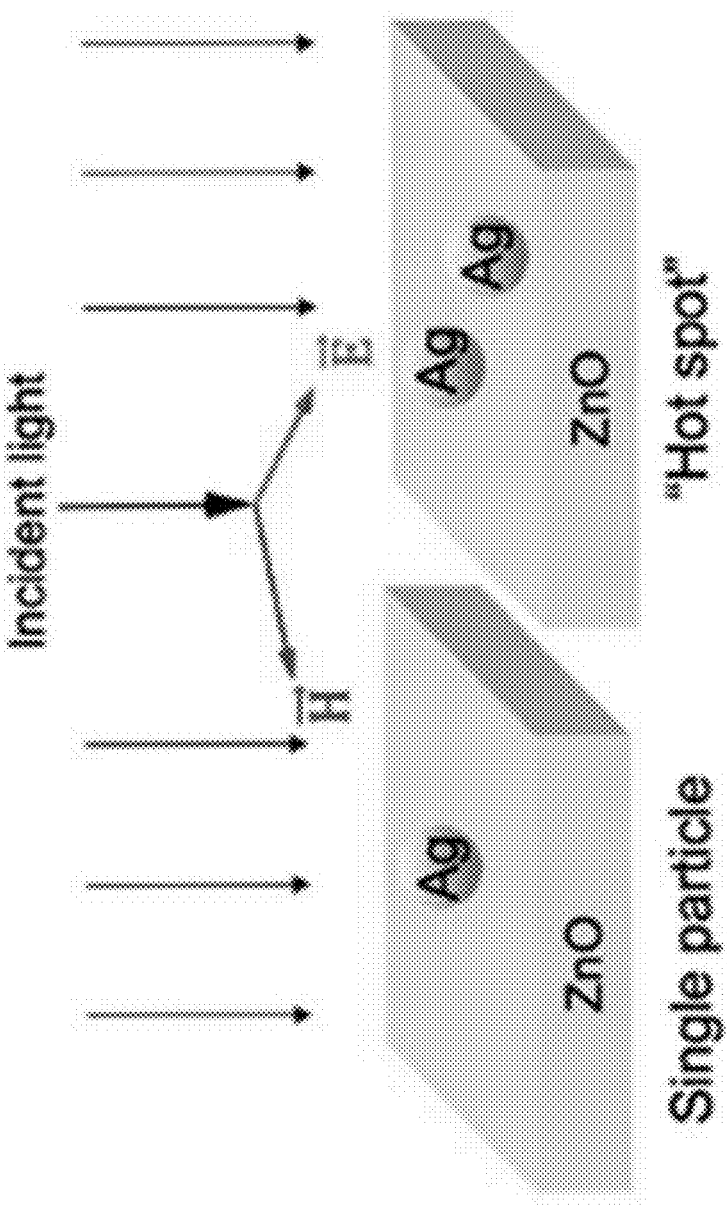
FIG. 3A is a schematic for a simulation of localized surface plasmon-enabled electrical field enhancement of an Ag-particle decorated ZnO with a single particle and a pair of particles close to each other (i.e., in a "hot spot")

Prior to the experimental Raman tests, the localized surface plasmonic resonance effect was simulated using a simplified model using finite element method (FEM) in COMSOL. FIG. 3A shows the schematic of the simulation model. There are two scenarios of the particle placement. The first is a single silver particle with 100 nm dimeter that was positioned at the center of a ZnO plate. The second is a pair of silver particles of the different sizes, i.e., 50, 100, and 150 nm diameter, with an inter-particle distance of 50, 100, and 150 nm. It was expected that a "hot spot" where a strong localized enhancement occurs would exist between the two particles that are in close proximity. The input excitation light was polarized along the long axis of the silver particle as shown in FIG. 3A and the electrical field was aligned with the two particles in the second scenario.

Figure 3B:
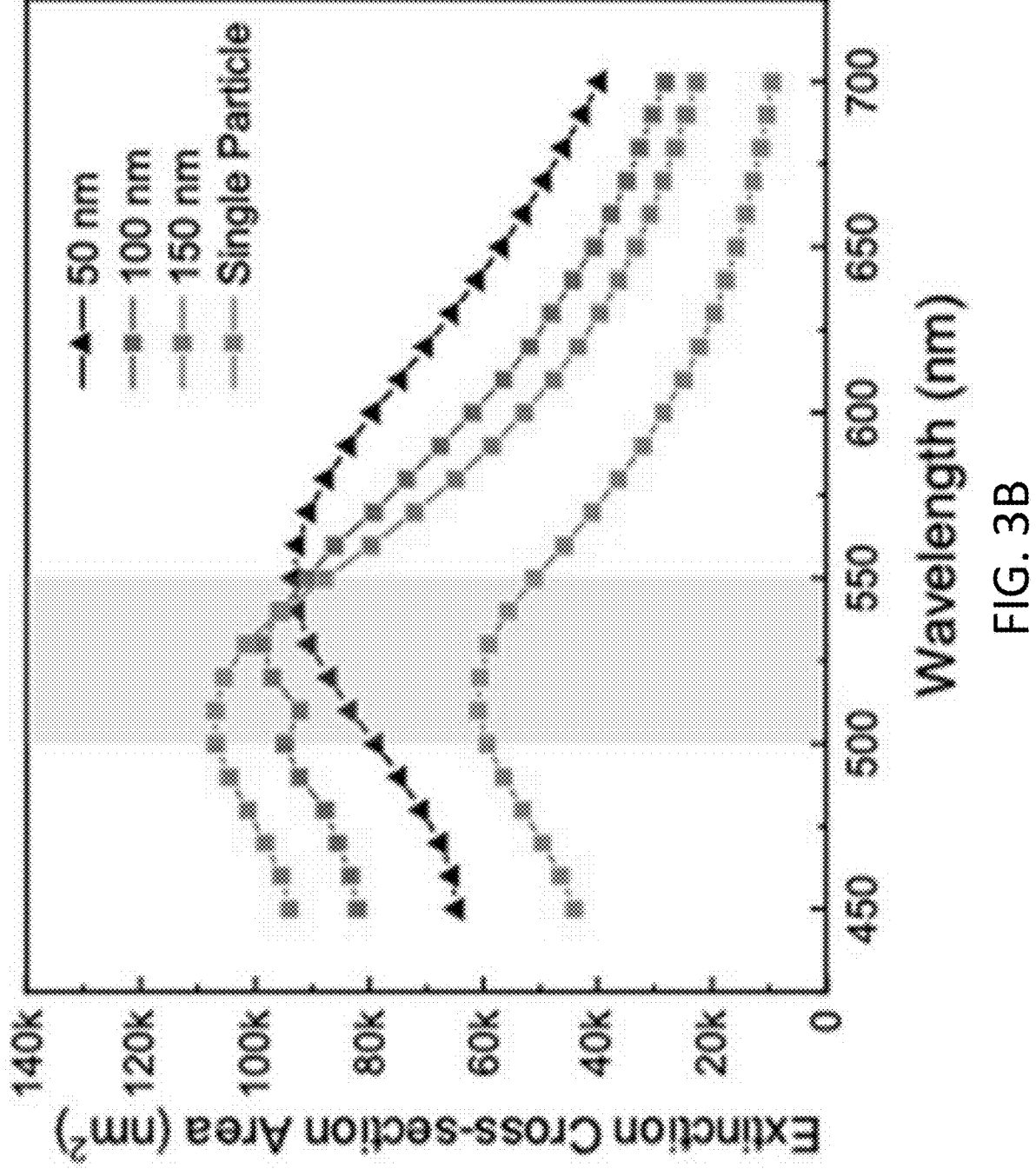
FIG. 3B shows an extinction cross-section area of the Ag particle(s) of 100 nm in diameter in a wavelength range from 450 nm to 700 nm with the grey area highlighting the range of peaks of all particle arrangements.

FIG. 3B shows the plot of the extinction cross-sections area (i.e., the sum of scattering and absorption cross-section area) of the silver particle at different wavelengths from 450 nm to 700 nm. This can be the scattering area divided by the total surface area of the particle(s)) at different wavelengths from 450 nm to 700 nm for the single silver particle and the pair of silver particles. The value of the extinction cross-section area reflects the local plasmonic enhancement effect of the particles. In the simulation, there are three pairs of Ag particles that are 100 nm in diameter and with an inter-particle distance of 50, 100, and 150 nm. As shown in the plot, the peaks of the extinction cross-section area for all particle arrangements fall in the range of 500-550 nm (highlighted in the grey area of FIG. 3B between 500 nm and 550 nm), which correspond to the localized plasmon resonance wavelength of these particle arrangements. Silver particle pairs induce a greater extinction cross-section area across the entire wavelength range than the single silver particle. This may be explained by the "hot spot" effect that is created between two silver particles that are adjacent to each other with a short inter-particle distance. The silver particle pair also induces a greater normalized scattering area across the entire wavelength range, and the normalized cross-section area of the silver particle pair is approximately 140% as large as that of a single silver particle at their peak wavelengths. A "hot spot" may be created in the silver particle pair.

Figure 3C:
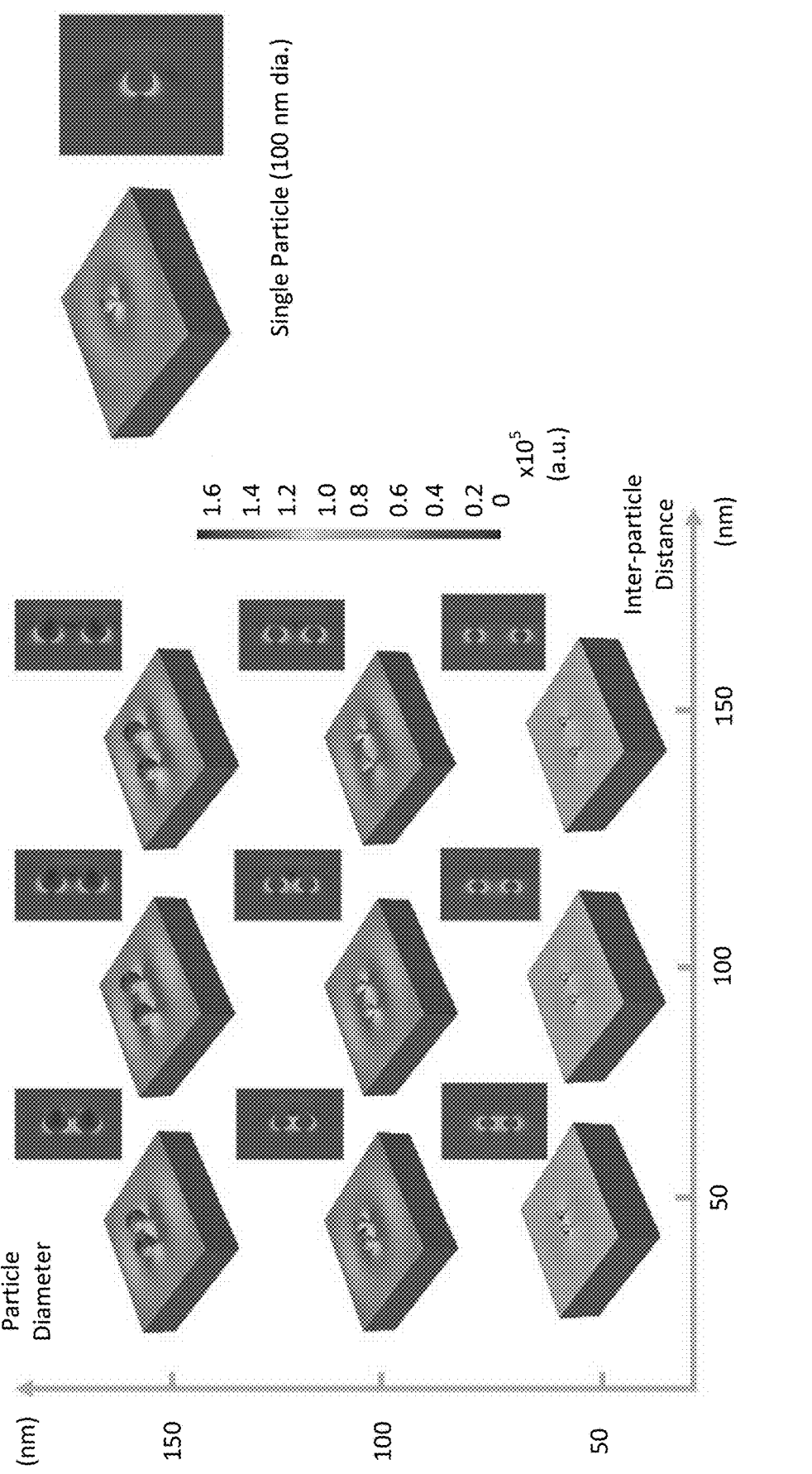
FIG. 3C is a simulated 3D model and the cross-sectional mapping showing the electric intensity of the Ag particle excited by a light of 540 nm wavelength with the shading representing electric field intensity.

FIG. 3C shows the 2D and 3D simulation models of the localized surface plasmon enabled electrical field enhancement (indicated by the shading contour) of the silver particles decorated on a ZnO platform excited by a light of wavelength 540 nm. In this set of simulations, silver particle pairs with 50, 100, and 150 nm particle diameter and 50, 100, and 150 nm inter-particle distance as well as a single particle of 100 nm diameter are tested. In FIG. 3C, when two silver particles are closer to each other (e.g., a 50 nm separation), there will be a "hot spot" in the gap between them, as indicated by the enhanced electrical field represented by the shading bridging the two particles. As the particles move farther apart from each other, the "hot spot" effect between them diminishes and eventually vanishes. Yet, the electromagnetic enhancement effect also can occur at a single silver particle, as seen from all particle arrangements in the simulation, especially the single silver particle one and the ones with the silver particle pairs farther apart (e.g., 150 nm inter-particle distance). Therefore, even individual silver particles or silver particles that are far apart from each other can have an increased local plasmonic effect as a result of the electromagnetic enhancement between the silver particle and the ZnO platform.

Figure 3D:
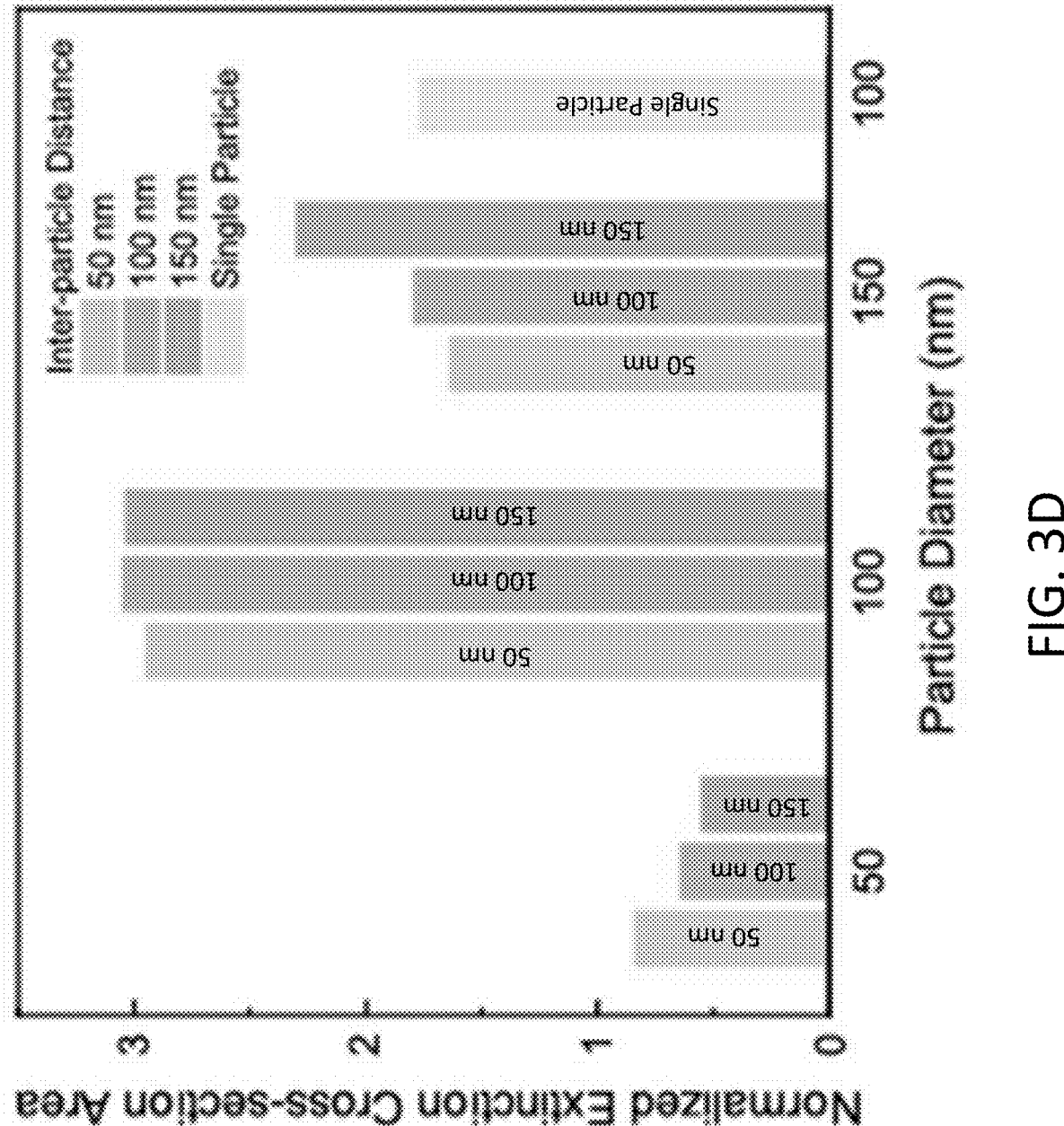
FIG. 3D is a normalized extinction cross-section area of the Ag particle pairs with 50, 100, and 150 nm diameter and with a 50, 100, and 150 nm inter-particle distance and of a single Ag particle.

The plot in FIG. 3D quantitatively summarizes the simulation result. The 100 nm diameter particles have a greater normalized extinction cross-section area or greater enhancement effect than the 50 and 150 nm diameter ones. Here, the normalized value is defined by the extinction cross-section area divided by the total surface area of the particles. In addition, for the 100 nm diameter cases, the particle pairs have a stronger enhancement effect than the single particle scenario. At the resonance wavelength of 550 nm, the light excited local electric field has the greatest intensity compared to those of 470 and 650 nm wavelength. Further, the highest intensity occurs at the Ag—ZnO interface for all cases and at the side of the particles that are facing each other in two-particle cases from which a "hot spot" is created. Overall, the simulation results demonstrated that a "hot spot" can occur when two silver particles are close to each other and that local enhancement can also occur between the silver particle and the ZnO substrate. In either case, the silver particle shows the greatest intensity of the light-matter interaction at its vicinity that can enhance the Raman signal.

Figure 4B:
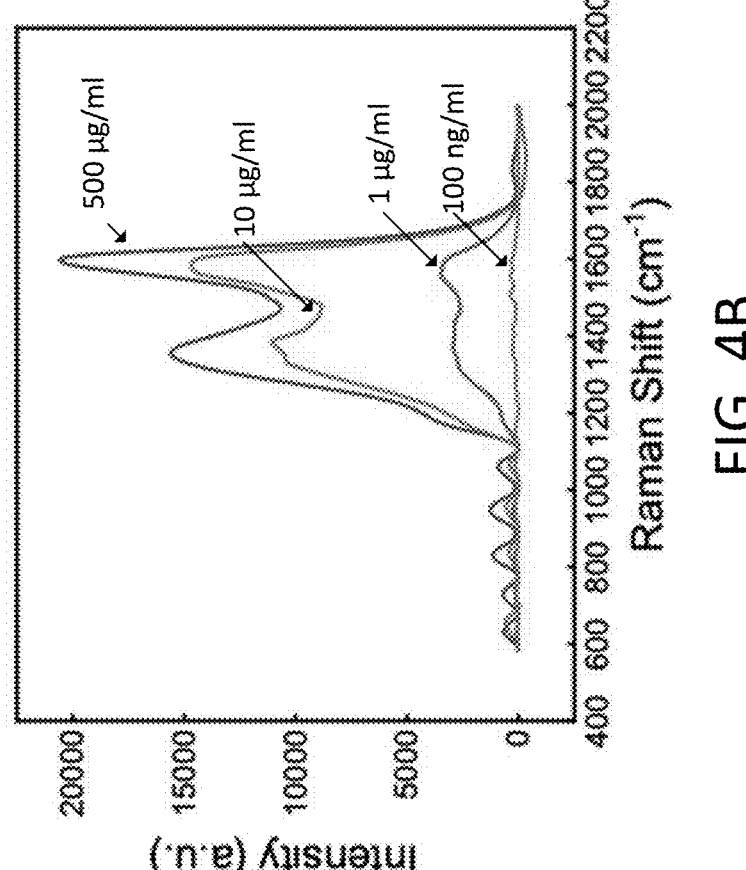
FIG. 4B shows the SERS signal from tested oxycodone solutions with oxycodone concentrations of 500 µg/mL, 10 µg/mL, 1 µg/mL, and 100 ng/mL, and pure methanol with a common baseline.
Figure 4A:
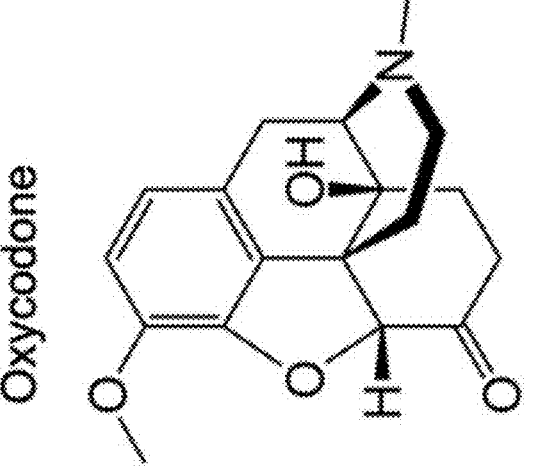
FIG. 4A shows a chemical structure of oxycodone.
Figure 4C:
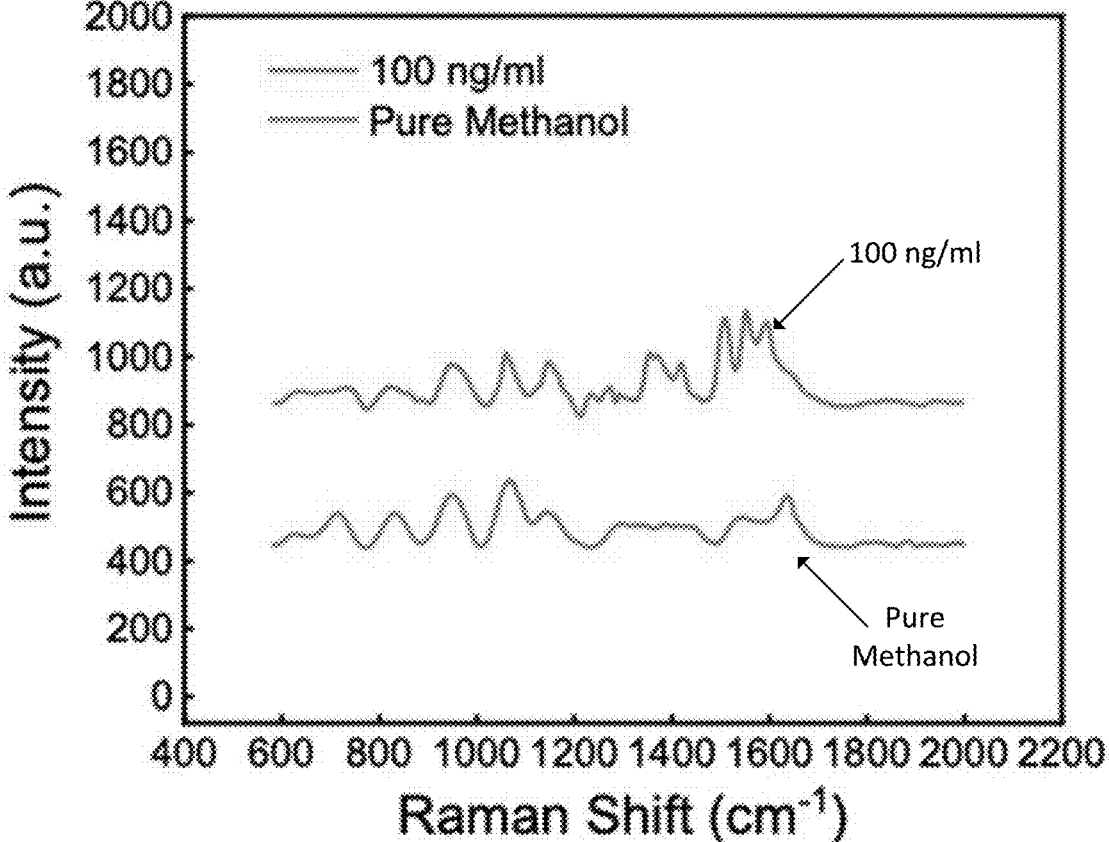
FIG. 4C is a comparison of the SERS peaks of the 100 ng/mL oxycodone solution and the pure methanol.
Figure 4D:
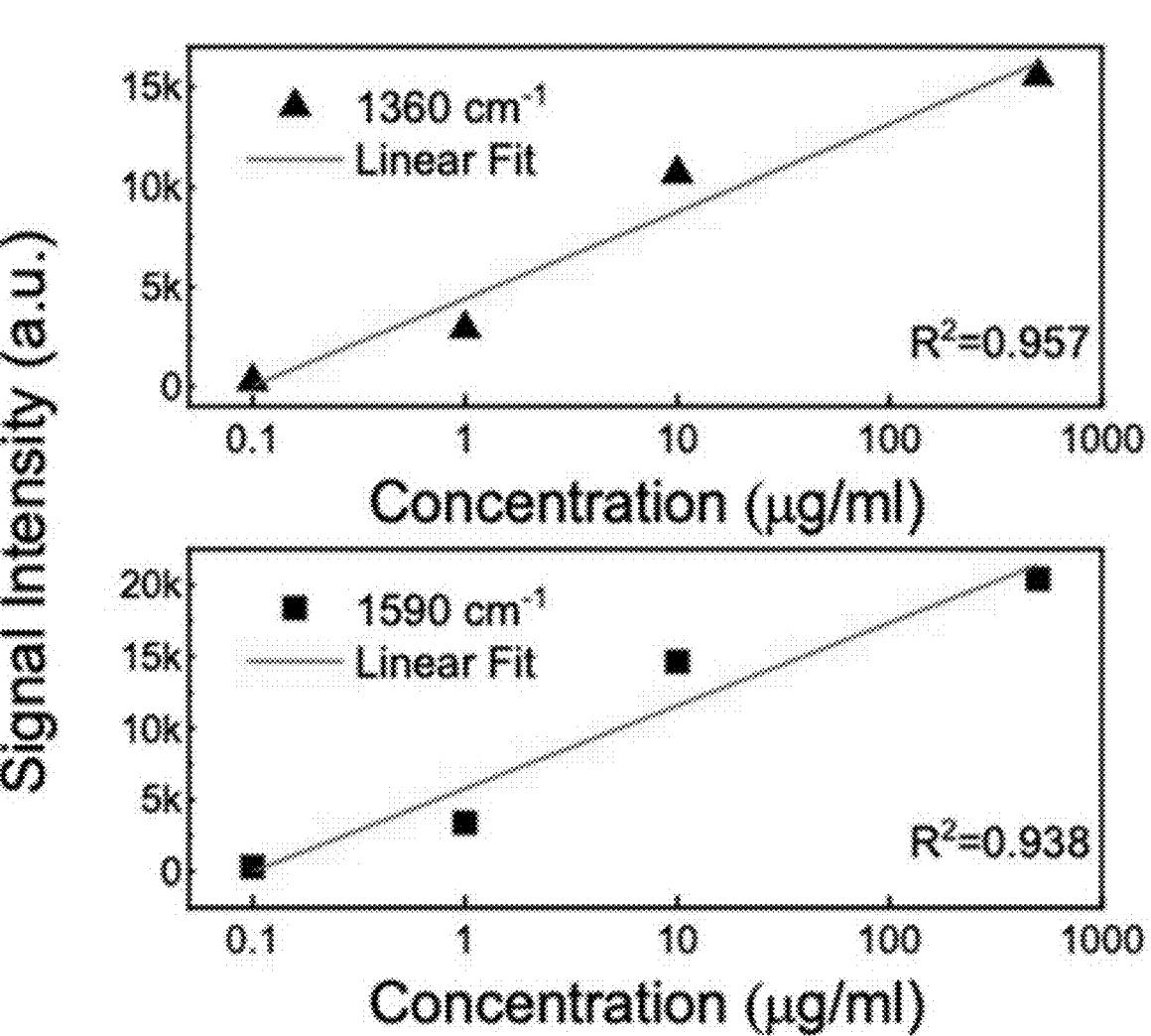
FIG. 4D shows signal intensity of the Raman spectroscopy of the 1360 nm peak and the 1590 nm peak showing a near-linear relationship with the oxycodone concentration in the logarithmic scale plot.

To verify the viability of the chips' opioid sensing function, a test was performed on commercially-available opioid-containing solutions before a systematic clinical study using human blood. Specifically, the chip was tested using a solution containing oxycodone, a potent and commonly-abused opioid, dissolved in methanol as a feasibility study. Opioid-containing solutions at varying concentrations were tested using the as-fabricated chip as a platform for label-free SERS-based detection of oxycodone whose chemical structure is shown in FIG. 4A. 5 μL solutions containing oxycodone dissolved in methanol were dropped onto the chip placed under the objective lens of a Raman spectrometer. The substrate was exposed to a focused laser with a wavelength of 532 nm, which is determined from the simulation that shows a resonance at 550-560 nm where the simulated signal is at its highest level (FIG. 3B). Oxycodone concentrations of 500 μg/mL, 10 μg/mL, 1 μg/mL and 100 ng/mL showed the highest characteristic peaks in the Raman spectroscopy with a common baseline at around 1360 cm$^{-1}$ and 1590 cm$^{-1}$ (FIG. 4B) which agree with the known values. The approximately 1360 cm$^{-1}$ band is attributed to the stretching CC bond in ring C, the bending CH bond, and the wagging CH$_2$ bond in ring B, while the approximately 1590 cm$^{-1}$ band is attributed to the stretching CC bond in ring C, the wagging CH$_2$ bond in ring B. In addition, pure methanol was measured under the same test condition as a control group and showed no peaks at around 1360 cm$^{-1}$ and 1590 cm$^{-1}$ compared to the 100 ng/mL concentration of oxycodone as shown in FIG. 4C. Note that, for the 100 ng/mL oxycodone solution, although signal noise is present due to a low intensity of signal, the 1360 cm$^{-1}$ and 1590 cm$^{-1}$ peaks are still distinguishable. Furthermore, the signal intensity of the Raman spectroscopy for both peaks are plotted at each of the oxycodone concentration (FIG. 4D). The Raman signal intensity increases as oxycodone concentration increases, and it is a near-linear relationship in the logarithmic scale plot as indicated by the linear fit curve with an R$^2$ value being 0.957 and 0.938 for the 1360 cm$^{-1}$ and 1590 cm$^{-1}$ characteristic peaks, respectively. All these Raman curves for different concentrations share the same Raman shift locations for each of the corresponding peaks, proving the repeatability of the test on the ZnO array substrate decorated with silver particles. From this test, it is demonstrated that the chip with the ZnO array decorated with silver particles could provide a high-throughput method for mapping detailed patterns of oxycodone to a large range of concentration from 500 μg/mL to 100 ng/mL, thereby leading to the next more practical, clinical trial using human blood serum.

After the viability of the chips' opioid sensing function was verified through a proof-of-concept test using commercially available opioid-containing solution, a clinical study using human blood serum samples was performed. The chip with the ZnO array decorated with silver particles was tested with serum samples containing oxycodone with five different concentrations. These concentrations included 900 μg/mL, 90 μg/mL, 9 μg/mL 900 ng/mL, and 90 ng/mL. The preparation of the serum sample and the experimental method are detailed herein. Like the previous test, these samples were tested using the as-fabricated chip as a platform for label-free SERS-based technique, and the same Raman settings and parameters were used for this test. FIGS. 5A-5E show the Raman signal spectrum for each oxycodone concentration of 900 μg/mL, 90 μg/mL, 9 μg/mL, 900 ng/mL, and 90 ng/mL, respectively. All spectrums show the highest characteristic peaks at around 1360 cm$^{-1}$ and 1590 cm$^{-1}$, which agree with the previous test (FIG. 4B) and reported values. Again, the approximately 1360 cm$^{-1}$ band is attributed to the stretching C—C bond in ring C, the bending C—H bond, and the wagging —CH$_2$ bond in ring B, while the approximately 1590 cm$^{-1}$ band is attributed to the stretching C—C bond in ring C and the wagging —CH$_2$ bond in ring B of the oxycodone molecule.

Figures 5A, 5B:
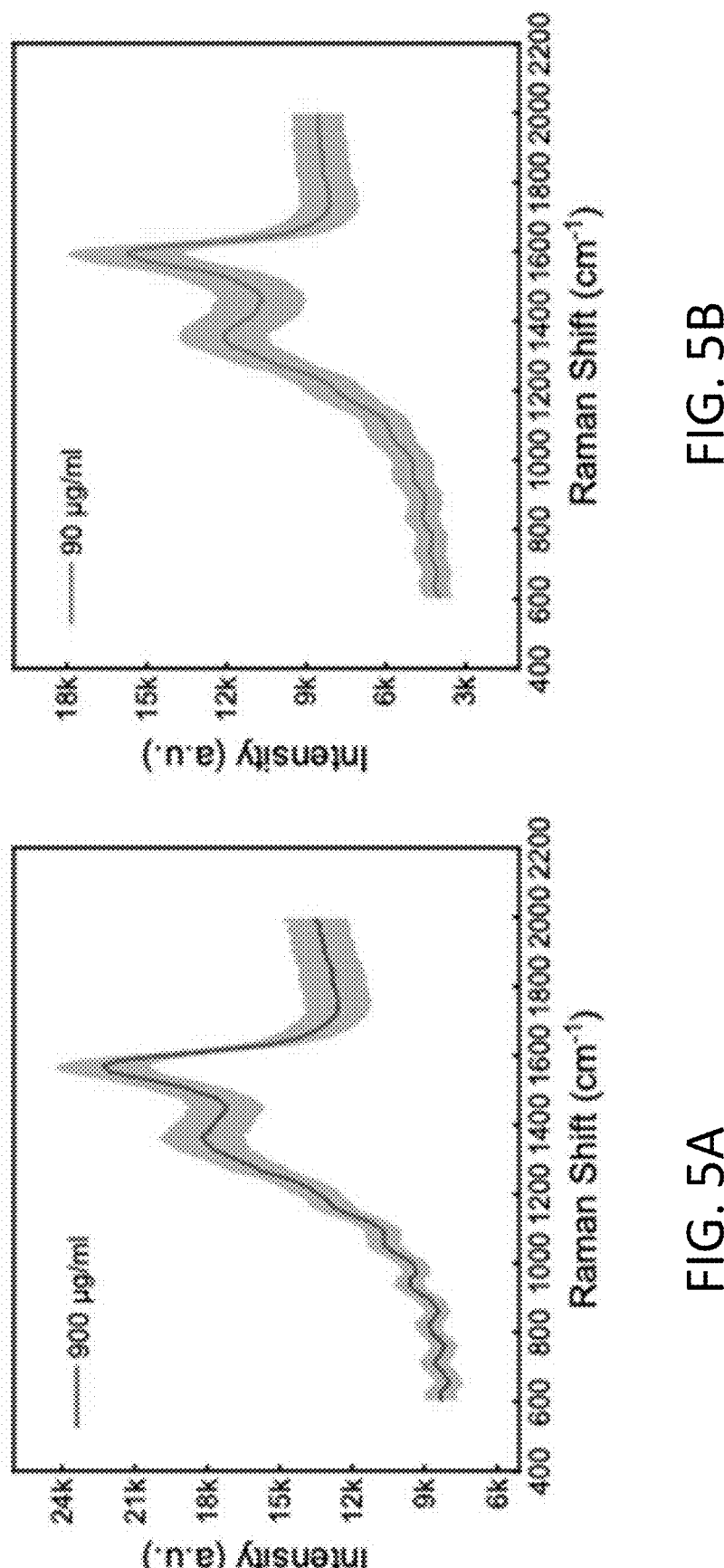
FIG. 5A shows a SERS signal for a blood serum sample with an oxycodone concentration of 900 µg/mL with error bars in the shaded area.
FIG. 5B shows a SERS signal for a blood serum sample with an oxycodone concentration of 90 µg/mL with error bars in the shaded area.
Figures 5C, 5D:
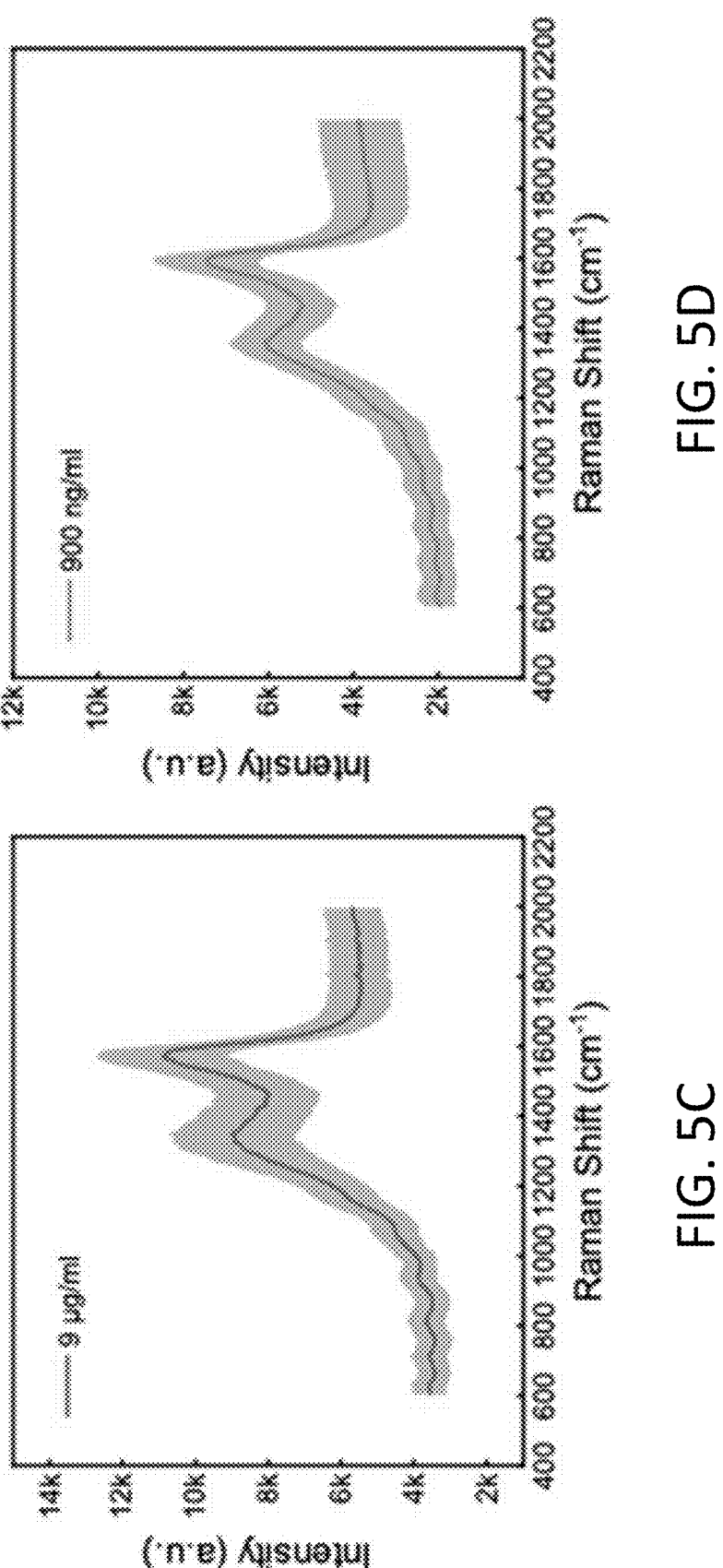
FIG. 5C shows a SERS signal for a blood serum sample with an oxycodone concentration of 9 µg/mL with error bars in the shaded area.
FIG. 5D shows a SERS signal for a blood serum sample with an oxycodone concentration of 900 ng/mL with error bars in the shaded area.
Figures 5E, 5F:
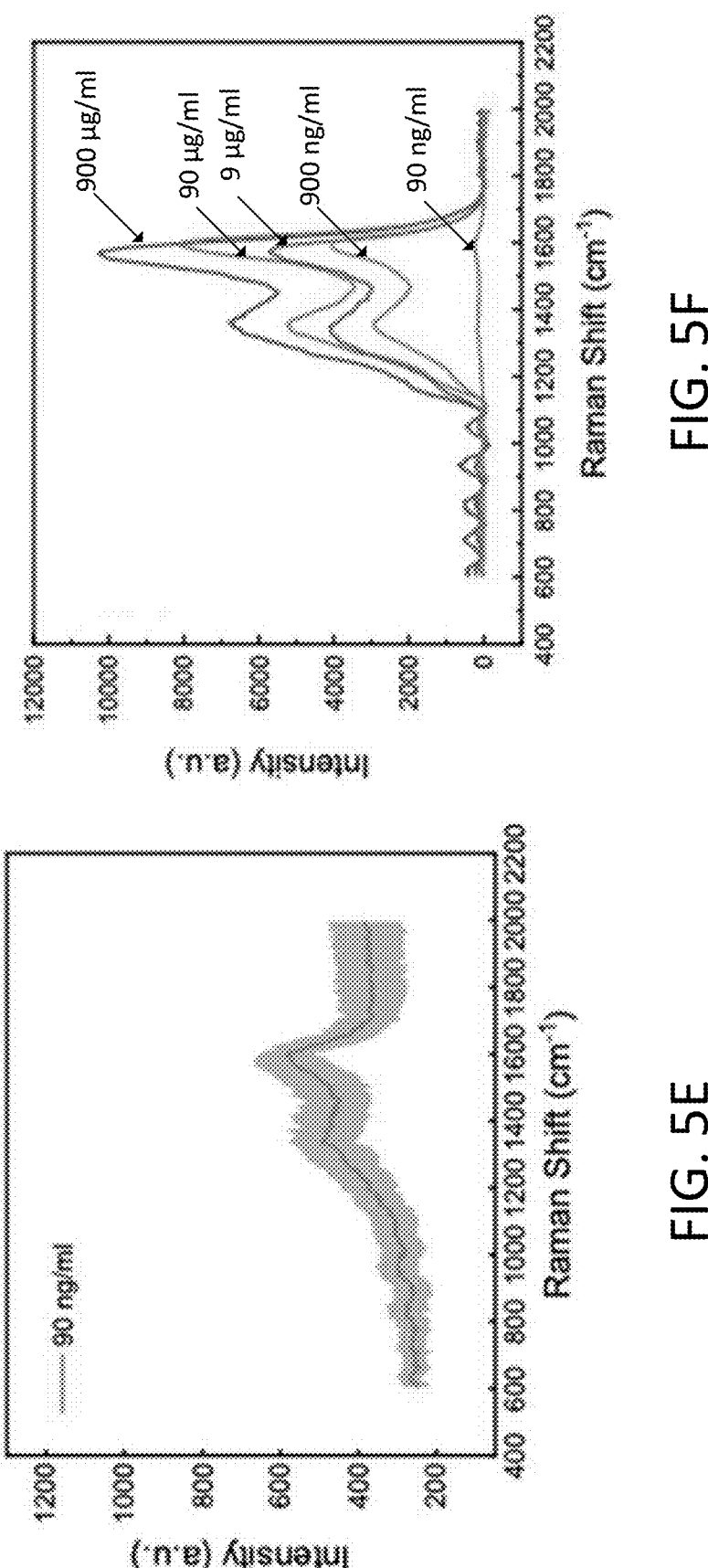
FIG. 5E shows a SERS signal for a blood serum sample with an oxycodone concentration of 90 ng/mL with error bars in the shaded area.
FIG. 5F shows a comparison of the SERS signals of all oxycodone concentrations from FIGS. 5A-5E with a common baseline.
Figures 5G, 5H:
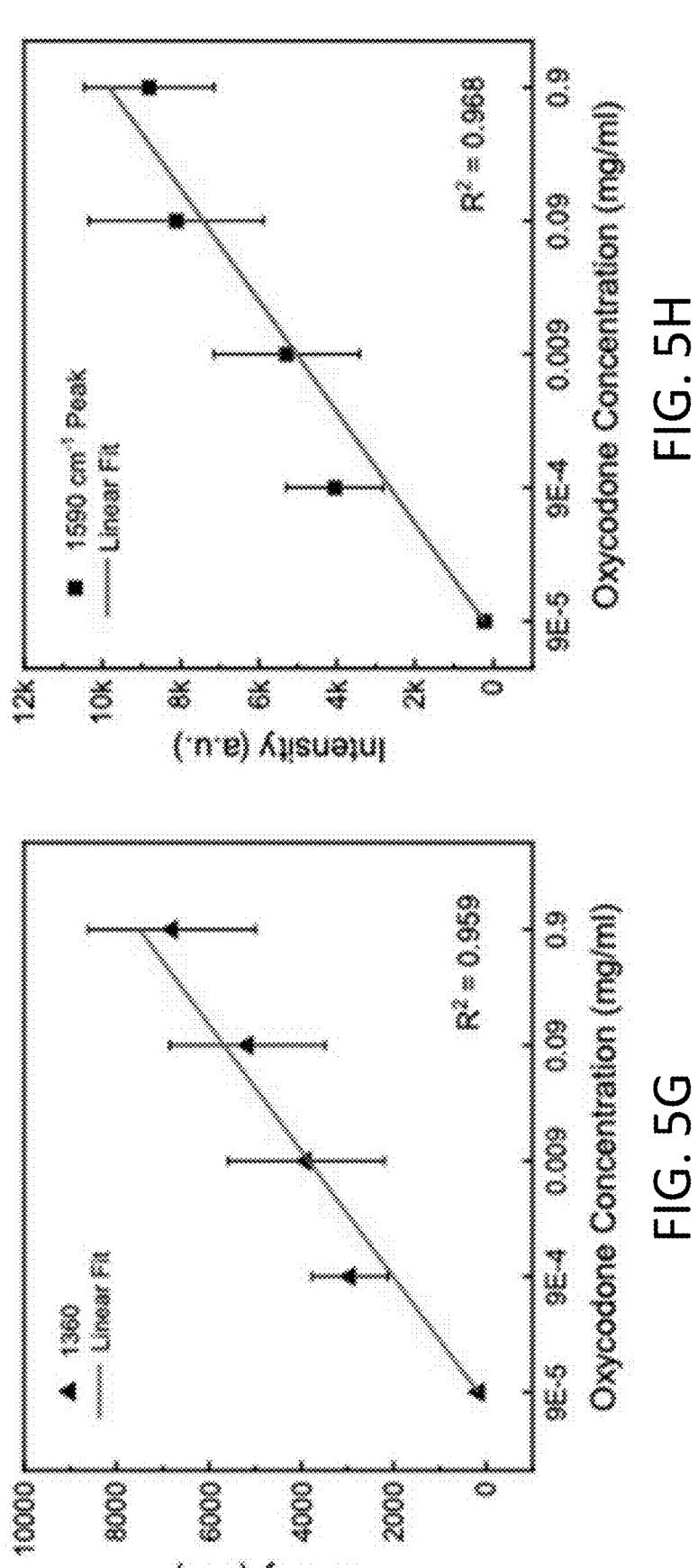
FIG. 5G shows signal intensity versus oxycodone concentrations at the characteristic peaks at 1360 cm⁻¹ with error bars representing standard deviation of data points.
FIG. 5H shows signal intensity versus oxycodone concentrations at the characteristic peaks at 1590 cm⁻¹ with error bars representing standard deviation of data points.

Even the lowest oxycodone concentration, 90 ng/mL, shows the distinctive characteristic peaks, demonstrating a detection ability at this low concentration that is on the approximate same level of the lowest concentration reported by literature using immunoassay and GC-MS methods (i.e., 10 ng/mL). Yet, compared with these immunoassay and GC-MS methods, the testing method disclosed herein using SERS technique with the chip with the ZnO array decorated with silver particles is less laborious, less time-consuming, and less expensive. Applying the serum sample to the chip to reading a result may only take less than 10 minutes. Further, the Raman signal from each oxycodone concentration is summarized in FIG. 5F with a common baseline for comparison purpose. All Raman spectrums share the same 1360 cm$^{-1}$ and 1590 cm$^{-1}$ characteristic peaks of oxycodone and their signal intensity decreases as the oxycodone concentration decreases. To show the relationship between the signal strength and the concentration, the intensity of the Raman spectroscopy of at 1360 cm$^{-1}$ and 1590 cm$^{-1}$ characteristic peaks are plotted at each of the oxycodone concentration (FIGS. 5G and 5H). For both peaks, the Raman signal intensity increases as oxycodone concentration increases. The linear regression model shows a positive linear relationship between the oxycodone concentration and the signal intensity (in the logarithmic scale plot) with an R$^2$ being 0.959 and 0.968 for the 1360 cm$^{-1}$ and 1590 cm$^{-1}$ characteristic peaks, respectively, exhibiting a good sensitivity of this detection technique. From this test with blood serum samples, it is demonstrated that chips with the ZnO arrays decorated with silver particles and the SERS technique provide a high-throughput method for detecting the opiate substance oxycodone by identifying its characteristic peaks for a large range of concentrations (from 900 μg/mL to 90 ng/mL) and with improved accuracy and sensitivity.

While other mechanisms are possible, the SERS based enhancement can be attributed primarily to the electromagnetic mechanism and the chemical mechanism. The former is associated with the localized surface plasmonic resonance and the resulted enhanced electric field and light-matter interaction. The latter is based on the resonance of the incident photon energy and charge transfers. The electromagnetic mechanism is the dominating mechanism as its enhancement is several orders of magnitude larger than that of the chemical mechanism. Furthermore, there are factors that can determine the magnitude of the SERS enhancement including the intrinsic properties of the decorated silver particles and ZnO, the size of the particles, and the interparticle distance. The gap between two close silver particles will create a "hot spot," which contribute to a SERS enhancement. It is believed that the enhancement will increase as the interparticle distance becomes shorter. In this example, the silver particles are randomly distributed, their fabrication and deposition parameters (e.g., silver nitrate concentration, UV intensity, exposure time) can be controlled so that the density and size of the particles can be controlled. As a result, the variance between each as-fabricated substrate can be minimized to ensure reproducibility. By using a filter of the Raman spectroscopy that allows for higher power from the laser, enhanced signals are expected that can find the detection limit of the concentration of oxycodone that is below 90 ng/mL.

Silver decorated ZnO arrays chip were demonstrated using a two-step fabrication strategy for the SERS detection of opioids. Results demonstrate that this design allows for a large SERS detection range for opioids concentrations, from 900 µg/mL to 90 ng/mL, with accuracy and sensibility. This is due to the plasmonic signal enhancement caused by the silver particles scattered across a ZnO array scaffolding. Amplification observed in experiments was verified using the FEM simulation. The detection method is label-free and portable, which can provide an effective point-of-care and solution for sensitive, high-throughput, and low-cost drug abuse detection, especially for opiate substances.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A test system comprising:
a silicon wafer;

a plurality of zinc oxide (ZnO) pillars arranged in an array on the silicon wafer, wherein each ZnO pillar has a top surface and a side surface between the top surface and the silicon wafer; and
a plurality of silver particles disposed on the ZnO pillars;
wherein the ZnO pillars have a cross-sectional dimension of 200 nm to 3 µm.

2. The test system of claim 1, wherein the silver particles are disposed on the top surface and the side surface of one or more of the ZnO pillars.

3. The test system of claim 1, wherein the cross-sectional diameter is from 1.7 µm to 2.3 µm.

4. The test system of claim 1, wherein the silver particles have an average diameter of 50 to 200 nm.

5. The test system of claim 4, wherein the average diameter is from 106 nm to 188 nm.

6. The test system of claim 1, wherein an average distance between silver particles is a non-zero value around 100 nm or less.

7. The test system of claim 1, wherein a density of ZnO pillars is from 10 to 12 pillars in every 100 µm² area.

8. A method comprising:
decomposing zinc acetate into zinc oxide (ZnO) nanocrystals on a silicon substrate;
growing ZnO pillars on the ZnO nanocrystals in zinc nitrate hexahydrate and hexamethylenetetramine (HMTA) solution; and
applying silver particles to the ZnO pillars using ultraviolet radiation;
wherein the ZnO pillars have a cross-sectional dimension of 200 nm to 3 µm.

* * * * *